(12) United States Patent
Scesney

(10) Patent No.: US 8,584,475 B2
(45) Date of Patent: Nov. 19, 2013

(54) SELF-CONTAINED WATER GENERATION SYSTEM

(75) Inventor: George Scesney, Atlanta, GA (US)

(73) Assignee: George Scesney, Atlanta, GA (US)

( * ) Notice: Subject to any disclaimer, the term of this patent is extended or adjusted under 35 U.S.C. 154(b) by 504 days.

(21) Appl. No.: 12/826,826

(22) Filed: Jun. 30, 2010

(65) Prior Publication Data

US 2010/0326101 A1  Dec. 30, 2010

Related U.S. Application Data

(60) Provisional application No. 61/221,859, filed on Jun. 30, 2009.

(51) Int. Cl.
| | |
|---|---|
| F25D 15/00 | (2006.01) |
| F25D 21/00 | (2006.01) |
| F25D 23/12 | (2006.01) |
| F25D 21/14 | (2006.01) |
| F25B 27/00 | (2006.01) |
| F03D 9/00 | (2006.01) |
| F03B 7/00 | (2006.01) |

(52) U.S. Cl.
USPC ............. 62/119; 62/150; 62/236; 62/272; 62/260; 62/291; 62/285; 290/55; 416/19

(58) Field of Classification Search
USPC ............. 62/150, 236, 272, 260, 291, 285; 290/55; 416/19
See application file for complete search history.

(56) References Cited

U.S. PATENT DOCUMENTS

| | | | |
|---|---|---|---|
| 2,214,933 A * | 9/1940 | Nelson | 62/184 |
| 3,874,816 A | 4/1975 | Sweeney et al. | |
| 4,015,962 A * | 4/1977 | Tompkins | 62/175 |
| 4,057,270 A | 11/1977 | Lebost | |
| 4,406,579 A | 9/1983 | Gilson | |
| 4,471,612 A | 9/1984 | Buels | |
| 4,692,094 A * | 9/1987 | Kulinyak | 416/11 |
| 5,080,555 A | 1/1992 | Kempinger | |
| 5,484,257 A | 1/1996 | Osborn | |
| 5,709,419 A | 1/1998 | Roskey | |
| 2004/0067136 A1 | 4/2004 | Roberts | |
| 2005/0148420 A1* | 7/2005 | Murao | 474/133 |
| 2008/0050234 A1* | 2/2008 | Ingersoll et al. | 416/132 B |
| 2008/0279687 A1 | 11/2008 | Hofmann | |
| 2008/0289352 A1* | 11/2008 | Parent | 62/291 |
| 2011/0020123 A1* | 1/2011 | Anderson et al. | 416/98 |

FOREIGN PATENT DOCUMENTS

WO  WO 2011/002846  1/2011

* cited by examiner

*Primary Examiner* — Frantz Jules
*Assistant Examiner* — Erik Mendoza-Wilkenfel
(74) *Attorney, Agent, or Firm* — Woodcock Washburn LLP

(57) ABSTRACT

A self-contained water generation system is disclosed. The present system allows for the generation of water using only wind power and standard air conditioning components. A wind turbine drives, directly or indirectly, a compressor that compresses refrigerant and provides the refrigerant to a condenser and evaporator. During the evaporation of the refrigerant, water is condensed and collected for use. The components of the water generation system may be configured in a housing and movably mounted atop a column so that the housing can rotate about the column, allowing the wind turbine maximize the use of wind forces.

15 Claims, 10 Drawing Sheets

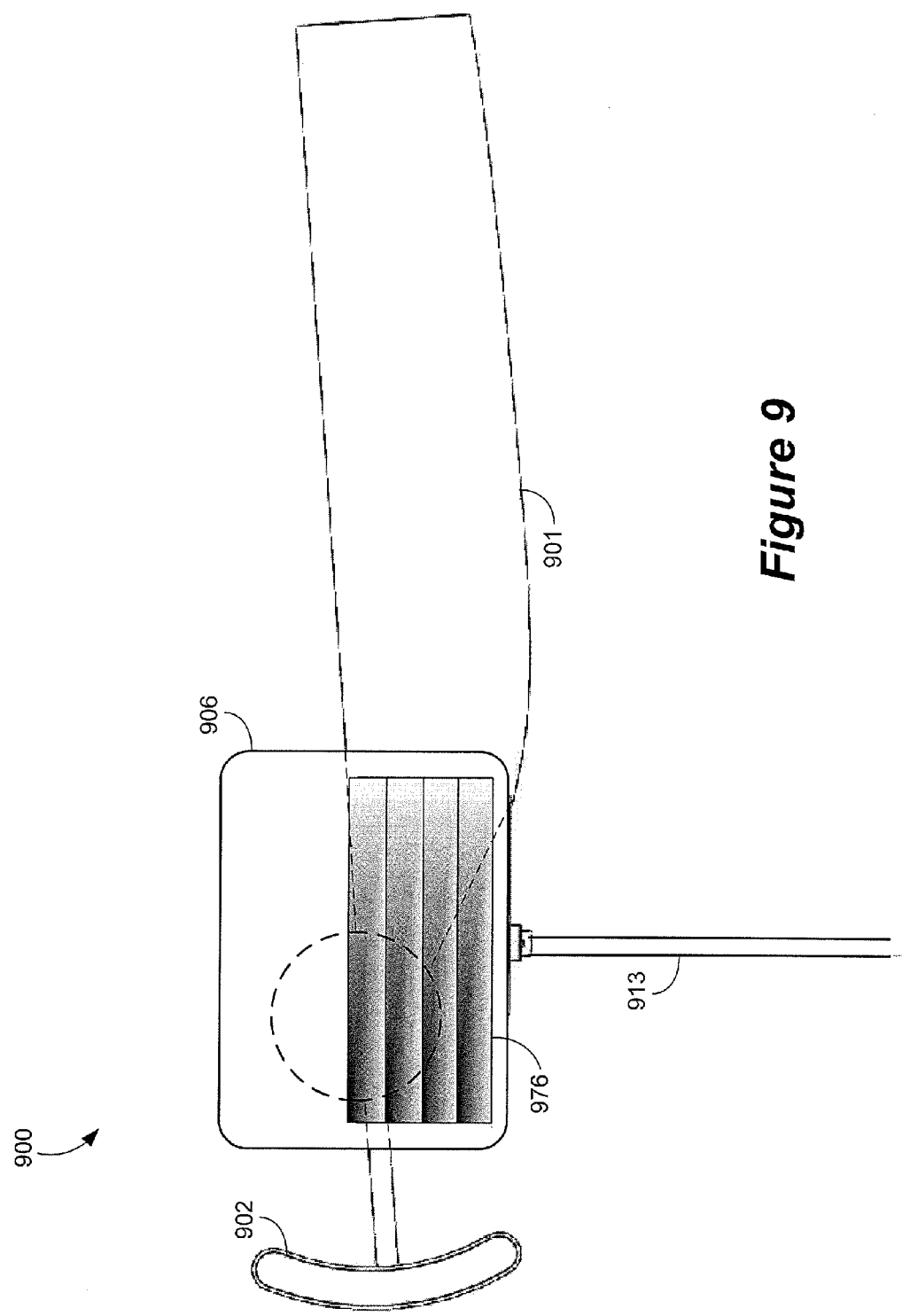

SELF-CONTAINED WATER GENERATION SYSTEM

CROSS-REFERENCE TO RELATED APPLICATIONS

This application claims the benefit of U.S. Provisional Application No. 61/221,859, filed Jun. 30, 2009, which is hereby incorporated by reference in its entirety.

FIELD OF THE INVENTION

This subject matter disclosed herein relates to a water generation system that condenses water from atmospheric water vapor through the reduction of air temperature.

BACKGROUND

Water is a scarce resource in many parts of the world. Typical methods of obtaining water where it is not readily available at the surface include digging wells and transporting water from remote locations where it is readily available at the surface. These methods are very labor intensive and can be quite expensive. These methods may also require resources that may not be available at remote locations, such as heavy machinery or electricity. In some areas, abundant sea water is available, but is not suitable for drinking or agriculture due to the water's salinity. Desalination techniques can be used to make usable water from sea water, but such techniques are expensive and require resources that are not readily available to many populations around the world. Therefore, a relatively inexpensive, mobile, and resource efficient method of generating usable water is needed.

SUMMARY

A self-contained water generation system is disclosed. The system may include a wind turbine that is capable of being actuated by the wind. The wind turbine may be configured with a single or multiple blades. The wind turbine may be attached to a shaft that, when rotated by the wind turbine, drives a belt system that further drives a compressor, and, in one embodiment, a fan that directs air flow on a condenser and/or evaporator. In an alternate embodiment, the wind turbine may directly drive the compressor, and, in another embodiment, the fan. The compressor, when driven directly or indirectly by the wind turbine, may compress a refrigerant that may be provided to a condenser and evaporator. Upon evaporation of the refrigerant within the evaporator, the evaporator may cool, condensing water from the environment on the exterior of the evaporator. This water may be captured and stored or used as needed. Components of the water generation system may be configured in a housing that may be configured atop or about a column in a manner that allows the housing to rotate about the column so that the wind turbine can be in a position to maximize the wind forces available. The housing may be enclosed in a shroud that may provide protection to the components. The housing may also serve to direct air that has been cooled by the evaporator towards the condenser to increase the efficiency of the system by using the cooled air to assist the condenser in cooling refrigerant.

Also disclosed is a blade for a wind turbine in a self-contained water generation system. The blade may be constructed of a spar and a sleeve with either a symmetrical or asymmetrical cross sectional shape that may form an aerodynamic leading edge for the blade. The sleeve may be affixed about the spar by inserting the spar through the sleeve. Attached to the sleeve may be a blade section that serves the function of catching wind forces in order to motivate the blade. Also attached to the spar may be a movable affixed blade tip portion that rotates on an axis running from the tip of the spar to the end of a root member. Such a root member may be attached to the bottom of the spar and the blade section. The blade tip portion may also attach to the blade section. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 9 is a graphical representation (side elevation view) of an exemplary, non-limiting louver system for a self-contained water generation system.

FIG. 10$b$ is a graphical representation (cross-sectional view) of an exemplary non-limiting blade that may be used in embodiments of a self-contained water generation system.

FIG. 10$c$ is a graphical representation (cross-sectional view) of an exemplary non-limiting blade that may be used in embodiments of a self-contained water generation system.

FIG. 10$d$ is a graphical representation (cross-sectional view) of an exemplary non-limiting blade that may be used in embodiments of a self-contained water generation system.

DETAILED DESCRIPTION

The subject matter of the present disclosure is described herein in reference to several specific embodiments. For example, several embodiments of the present disclosure are described herein for use generating water. However, it will be understood by those skilled in the art that various changes in form and detail may be made without departing from the scope of the present subject matter as set forth in the following claims. For instance, the present subject matter may utilize alternative means or mechanisms in any embodiment of the present subject matter to accomplish the functions of the present disclosure. Furthermore, although elements of the embodiments may be described or claimed in the singular, the plural is contemplated unless limitation to the singular is explicitly stated.

Figure 1:
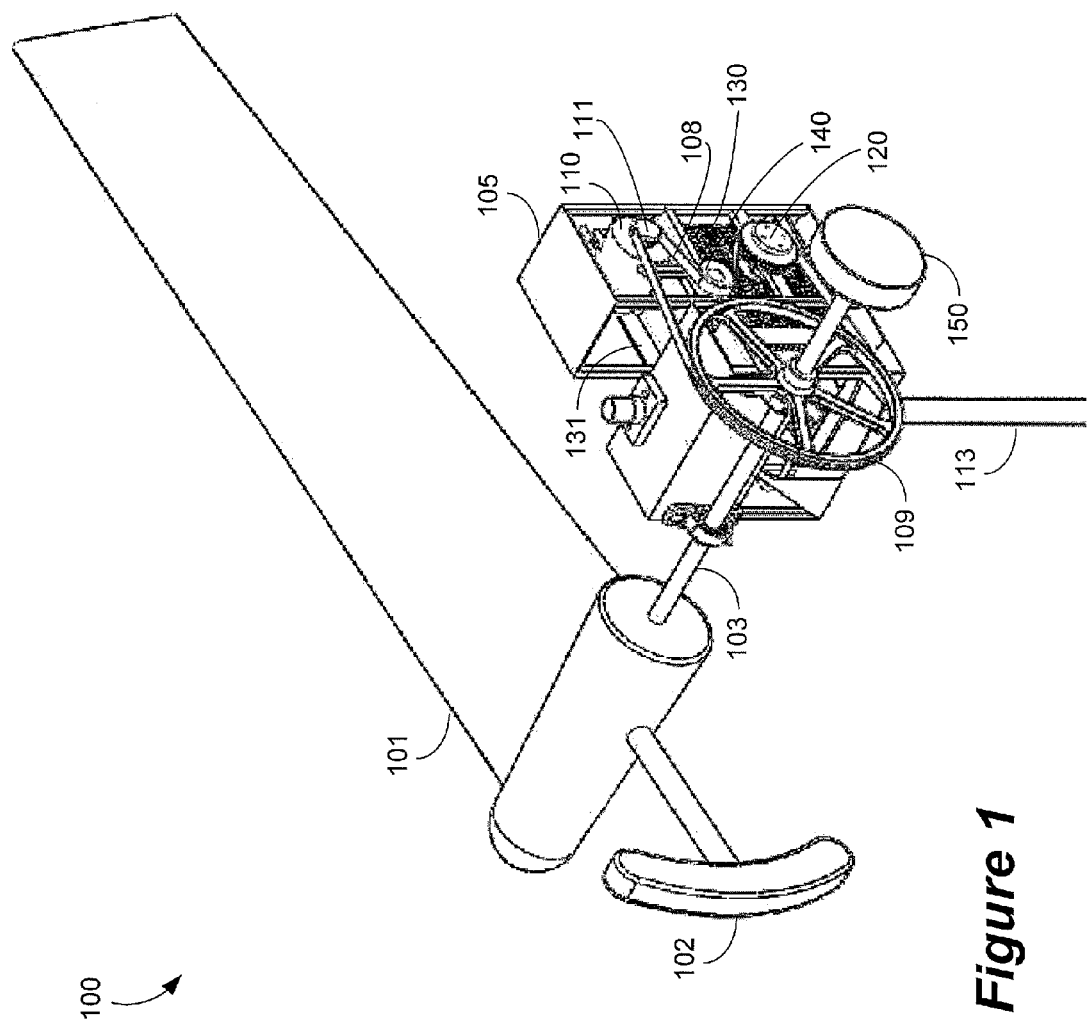
FIG. 1 is a graphical representation (perspective view) of an exemplary, non-limiting self-contained water generation system.

A perspective view of an exemplary, non-limiting self-contained water generation system 100 is illustrated in FIG. 1. In one embodiment, water generation system 100 is designed to condense atmospheric water vapor by reducing the air temperature to below the dew point through the mechanical compression and evaporation of a gas, such as a refrigerant. Water generation system 100 may use the wind to provide mechanical energy to actuate or otherwise power components typically used in air conditioning or dehumidification systems, resulting in the condensation and accumulation of water that may then be used for various purposes. In some embodiments, water generation system 100 is completely self-contained and does not rely on any external power sources other than the wind.

Water generation system 100 may incorporate a wind turbine water vapor condensing unit that may be constructed with a housing 105 mounted on a column 113. Housing 105 may be pivotally mounted on column 113, or may be movably or non-movably affixed to column 113. Alternatively, housing 105, or any arrangement or configuration of the components that may be used to construct system 100 as described herein, may be mounted, affixed, or otherwise attached to any other structure or surface. In another alternative, housing 105 or any arrangement or configuration of the components that may be used to construct system 100 as described herein, may be portable or otherwise not attached or affixed to any structure or surface.

Housing 105 may contain or be configured with a storage tank, or may serve as a storage tank for collecting condensed water. In one such embodiment, a condensate collector such as condensate collector 180 (see FIGS. 2-7) may be configured in housing 105. Alternatively, condensed water may be stored in a separate container or tank, another container or tank integrated into water generation system 100, or may be piped or otherwise transported out of water generation system 100 using any means, including gravity, electrical, and/or mechanical means. Such means include the use of column 113 as a conduit for transporting condensed water and/or as a storage means for condensed water.

The wind turbine portion of water generation system 100 may be a horizontal-axis wind turbine constructed with a single vertically oriented blade 101 attached to horizontally oriented shaft 103. Also attached to shaft 103 and/or blade 101 may be blade counterweight 102, which may serve to create dynamic balance with blade 101, creating a center of mass located at the axis of rotation of shaft 103. Blade 101 may provide overspeed protection by being configured with an appropriate blade twist or a mechanism that affects blade twist variably based on the speed of blade rotation. (See additional embodiments below.) Such overspeed protection may be desired so that blade 101, when being driven by high wind speeds, does not rotate shaft 103 at a rotational speed that may damage the components driven or otherwise affected by shaft 103. Alternatively, an overspeed protection device may be configured on system 100 to prevent damage to components of system 100. Additionally, counterweight 150 may be configured on the end of shaft 103 opposite the location of blade 101 to balance the weight of blade 101 and blade counterweight 102 so that the weight of system 100 is evenly distributed making system 100 more stable.

Blade 101 may be of any size and design. In one embodiment, blade 101 may be approximately 10 feet in length. In alternative embodiments, the wind turbine portion of water generation system 100 may be constructed with two or more blades, and with or without counterweights. Alternatively, the wind turbine portion of water generation system 100 may be a vertical-axis wind turbine which may incorporate any number of blades and counterweights. The blades used in water generation system 100 may be of any size, shape, style, or design. The blades may also be constructed with any pitch, and may be manually or automatically pitch adjustable. In one embodiment, water generation system 100 may be configured so that pitch adjustments may be made remotely by means including, but not limited to, radio control, wireless control, wired control, or any other control means. Any orientation of the blades and shafts used in water generation system 100 are contemplated, and all such elements may be constructed of any material or combination of materials.

Variable speed compressor 110 may be mounted in the housing. Variable speed compressor may be configured with compressor shaft 111, which may actuate internal components of compressor 110. Compressor shaft 111 may be driven via an attached pulley by belt 108. Belt 108 may be a serpentine belt or any other type of belt and may be constructed of any material and may be of any size and design. Belt 108 may be actuated by the movement of shaft 103 as blade 101 rotates shaft 103 in response to wind forces acting on blade 101. Shaft 103 may actuate belt 108 directly, or, as shown in FIG. 1, pulley 109 may be affixed about shaft 103 and may actuate belt 108. Because pulley 109 may be larger in diameter than shaft 103, the speed of the movement of belt 108 may be increased as compared to the speed attainable where belt 108 directly actuated by shaft 103. Any size or type of pulley 109 may be used, and such size and type may be determined based on a desired maximum and/or minimum belt speed and/or a desired maximum and/or minimum compressor shaft 111 rotational speed. Note also that the size and design of the pulley attached to compressor shaft 111 and/or the size and design of other components, including other pulleys, may be taken into account in determining an optimum configuration of system 100. In one embodiment, pulley 109 may be between 10 and 20 inches, while in another pulley 109 may be approximately 15 inches; however, pulleys of any size and design are contemplated as within the scope of the present disclosure.

Note that pulley 109 may be an integral part of shaft 103 such that shaft 103 and pulley 109 are constructed as a single unit, e.g., molded as one component during manufacture or machined out of a single piece of material. Alternatively, pulley 109 and shaft 103 may be separate components mechanically, chemically (e.g., glued), or otherwise affixed to one another such that rotation of shaft 103 results in rotation of pulley 109. Alternatively, there may be one or more intermediate devices or components between shaft 103 and pulley 109 that increase, decrease, or otherwise alter the rotational speed of pulley 109 in relation to the rotational speed of shaft 103 or perform other functions. All such embodiments are contemplated as within the scope of the present disclosure.

In some embodiments, belt 108 may also drive other components, such as fan bearing assembly 120. In one such embodiment, a fan (see FIG. 2) may be affixed to fan bearing assembly 120 to assist in cooling of system 100. For example, system 100 may be configured with evaporator 130 and/or condenser 131, either, or both, of which may benefit from the cooling effects produced by such a fan configured with fan bearing assembly 120. The fan may be ducted and the housing enclosed with a shroud to maximize the directed airflow generated by the fan towards evaporator 130 and/or condenser 131. Alternatively, or in addition, fan bearing assembly 120 may be any other component that may utilize actuation of belt 108

Belt tensioning pulley 140 may also be configured on system 100. Belt tensioning pulley 140 may serve to improve the performance of belt 108 and mechanisms driven by belt 108 by providing tension to belt 108. Belt tensioning pulley 140 may be adjusted by a nut and bolt tensioner in order to provide increased tension and/o leverage for belt 108. Additionally, or instead, belt tensioning pulley 140 may drive any other type of component that may be configured in such a system, or belt tensioning pulley 140 may merely serve as an additional pulley serving to improve performance of system 100 and/or provide increased leverage for belt 108. Alternatively, or in addition, belt tensioning pulley 140 may serve to allow the use of a belt 108 in a standard or particular size so that custom or special belts are not needed for system 100. Note that any number of pulleys and other components may be configured in system 100, and additional belts of any type may be used. All such embodiments are contemplated as within the scope of the present disclosure.

Figure 2:
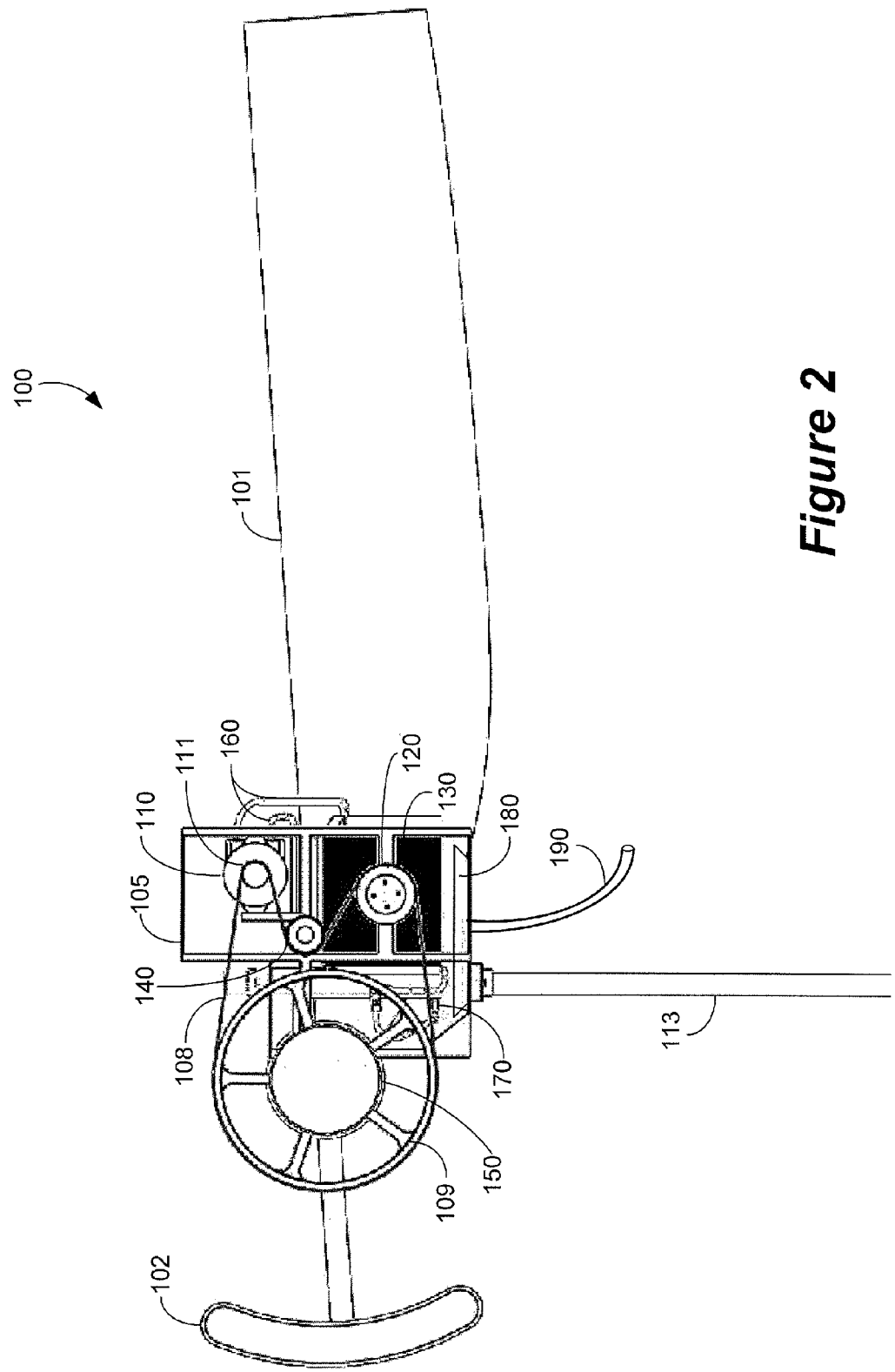
FIG. 2 is a graphical representation (side elevation view) of an exemplary, non-limiting self-contained water generation system.

FIG. 2 illustrates a side elevation of system 100, including blade 101, blade counterweight 102, counterweight 150, pulley 109, belt 108, compressor 110, compressor shaft 111, evaporator 130 (condenser 131 is present in FIG. 2, but obscured by evaporator 130), fan bearing assembly 120, belt tensioning pulley 140, housing 105, and column 113. Note that shaft 103 is present in the exemplary embodiment shown in FIG. 2, but is obscured by pulley 109 and counterweight 150. Also, portions of blade 101 are obscured by other components of system 100 when viewed from the viewpoint shown in FIG. 2.

System 100 may include refrigerant piping lines 160 and 170 that may connect condenser 131, evaporator 130, and compressor 110. In one embodiment, these components make up a sealed system containing refrigerant of any type, class, and/or American Society of Heating, Refrigerating and Air-Conditioning Engineers (ASHRAE) number. Compressor 110 may be configured to compress the refrigerant that may be contained within these components into a high pressure gaseous state. The refrigerant in a high pressure, gaseous state may be warmer than it was before compression was applied by compressor 110. Such refrigerant may then be provided to condenser 131 via refrigerant piping lines 160. Condenser 131 may be configured to cool the refrigerant into a liquid state. Condenser 131 may then feed the liquid refrigerant to evaporator 130. In one embodiment, the liquid refrigerant supplied to evaporator 130 may be metered by appropriate orifices or other means, which may be manually or automatically adjustable.

Evaporator 130 may evaporate the refrigerant to a low pressure gaseous state. Evaporation of the refrigerant inside evaporator 130 may make the temperature of evaporator 130 fall below the dew point, resulting in liquid water condensing on coils configured on evaporator 130. This liquid water may be condensed from an air stream moving over the coils of evaporator 130. The air stream may be, at least in part, due to the motion of a fan, for example affixed to fan bearing assembly 120 (not shown for clarity, see FIG. 3). Alternatively, the air stream may simply be provided by the environment in which system 100 is operating.

The low pressure, gaseous refrigerant produced by evaporator 130 may be fed back into compressor 110, to be processed again as described. In many embodiments, this process may be continuous and may occur at a rate determined, or affected, by the rate of rotation of blade 101 (and therefore the rate of rotation of shaft 103, pulley 109, belt 108, and/or compressor shaft 111) in response to received wind energy. In this way, the present subject matter provides for a self-contained water generation system that may require only wind forces as input in order to generate water as an out put. Note that although wind forces are described throughout the present disclosure as the primary input to such a system, any other forces that may provide the mechanical energy needed to run the process described above may be used. For example, electrical, gasoline, diesel, or other types of engines or motors may be used to actuate compressor 131. Alternatively, moving water may be harnessed to rotate a mechanism, such as a paddle wheel, that may be configured to actuate compressor 131. Any other means or mechanism may be used as an input and/or to provide mechanical or physical energy to the water generation system described herein, and all such embodiments are contemplated as within the scope of the present disclosure.

During the exemplary process described above, the liquid water that evaporator 130 condensed out of the air stream, or the air within which system 100 is operating, may be captured and/or collected by evaporator 130 and drained into condensate collector 180. In one alternative, no drain lines are configured in system 100, and condensed water may simply drip out of evaporator 130 and be captured by condensate collector 180 configured directly under evaporator 130 and/or an opening in evaporator 130 designed to allow condensed water to escape. Alternatively, condensate collector 180 may be otherwise configured to capture and retain condensed water produced by evaporator 130 via any other means, including mechanical pumping by a pump actuated, directly or indirectly, by belt 108, shaft 103, and/or any other component of system 100. Alternatively, such a pump may be electrical or operated by any other means.

Condensate collector 180 may be configured to feed collected water to column 113. This may be accomplished using one or more drain lines, pumps, or any other means that may be used to transport water from one location to another. Alternatively, drain line 190 may be configured on condensate collector 180 to allow the drainage of collected water into any type of receptacle or container. Drain line 190 may instead be a drain line that runs to any other device, component, system, or other destination where the water generated by system 100 may be of use.

As will be recognized by one skilled in the art, some of the elements disclosed herein may be similar to those used in common air conditioning systems. Other elements related to the proper and efficient functioning of an air conditioning system may be integrated or configured with water generation system 100, and all such embodiments are contemplated as within the scope of the present disclosure. Air conditioning and dehumidifying equipment used to produce the low temperatures needed to condense atmospheric water vapor into liquid water are well known in the art and therefore will not be described in detail herein. Note however, that unlike standard air conditioning equipment which is configured to remove the cooled air as the desired product to be used to cool other spaces, the present system may retain the cooled air as a secondary product and direct it over the condenser to increase the condenser's ability to cool the refrigerant.

Figure 3:
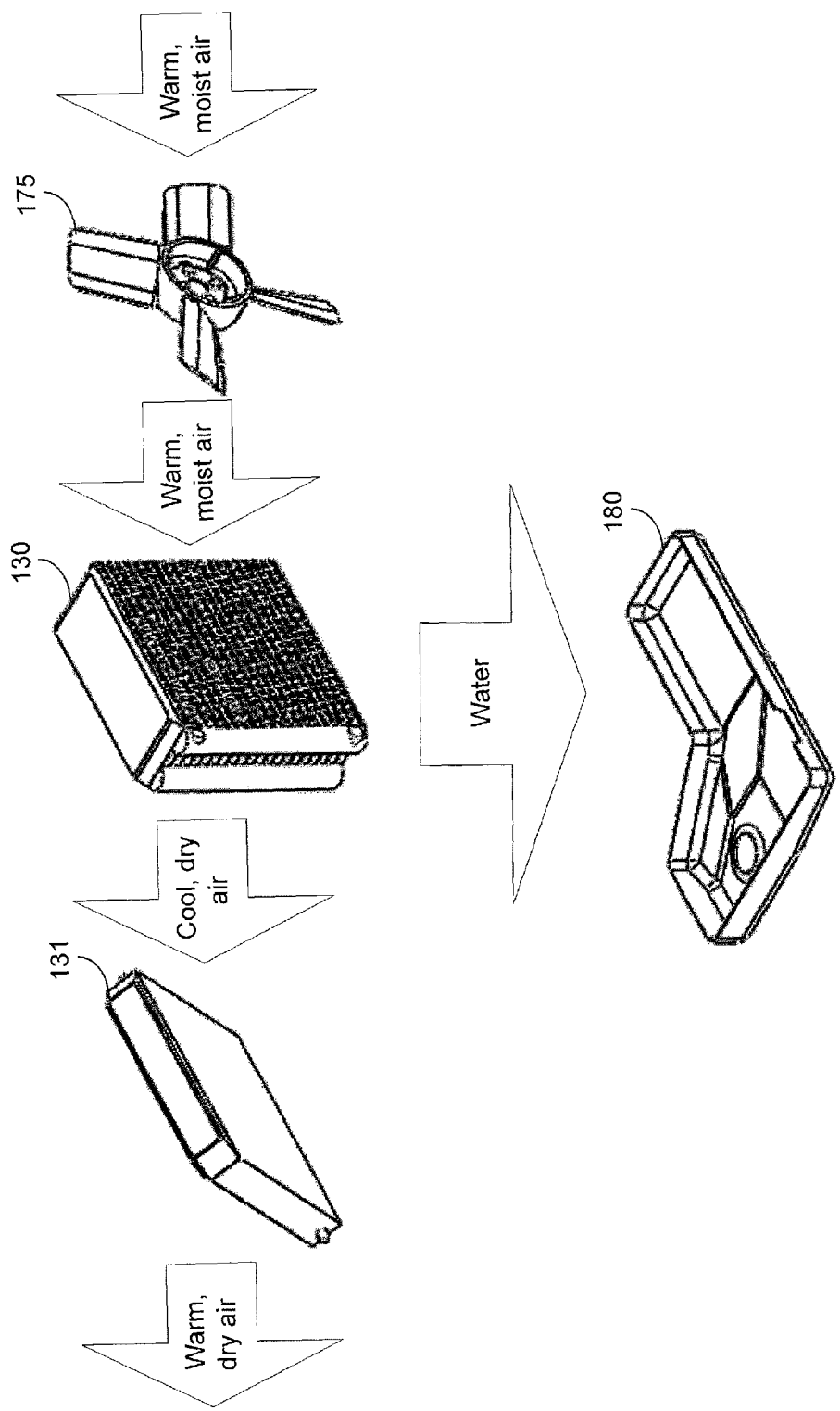
FIG. 3 is a graphical representation of an exemplary, non-limiting water generation process.

For example, FIG. 3 illustrates a simplified graphical depiction of fan 175, evaporator 130, condenser 131, and condensate collector 180 described above in an orientation used in some embodiments. Fan 175, described in more detail below, may be configured on fan bearing assembly 120 and may be driven by belt 108. FIG. 3 shows an exemplary air flow that may be created by configuring these components in the positions shown in FIG. 3 or similar configurations. Fan 175 may be configured such that when rotated (e.g., driven by belt 108 in one embodiment) it draws warm, moist air toward fan 175 from the environment and propels such warm, moist air towards evaporator 130 and/or condenser 131. Note that in alternate embodiment, fan 175 may be configured on the opposite end of the subsystem shown in FIG. 3 such that fan 175 may propel air away from condenser 131 and into the environment, thus drawing air over condenser 131 and evaporator 130 rather propelling air over these components.

Evaporation of the refrigerant inside evaporator as described above may make the temperature of evaporator 130 fall below the dew point, resulting in liquid water condensing on coils configured on evaporator 130. This water may drip or otherwise be fed into condensate collector 180. As the warm, moist air passes through and around evaporator 130, it may be cool and become dry due to the condensation of the water content of the warm, moist air on the coils of evaporator 130. The resulting cool, dry air may be propelled towards condenser 131, in one embodiment at least in part by the air propulsion generated by fan 175. As condenser 131 cools the refrigerant received from a compressor into a liquid state, heat may be generated which may transform the cool, dry air coming from evaporator 130 into warm, dry air. Thus, the present system may be configured to use the cooled air as a secondary product and direct it over the condenser to increase the condenser's ability to cool the refrigerant.

Figure 4:
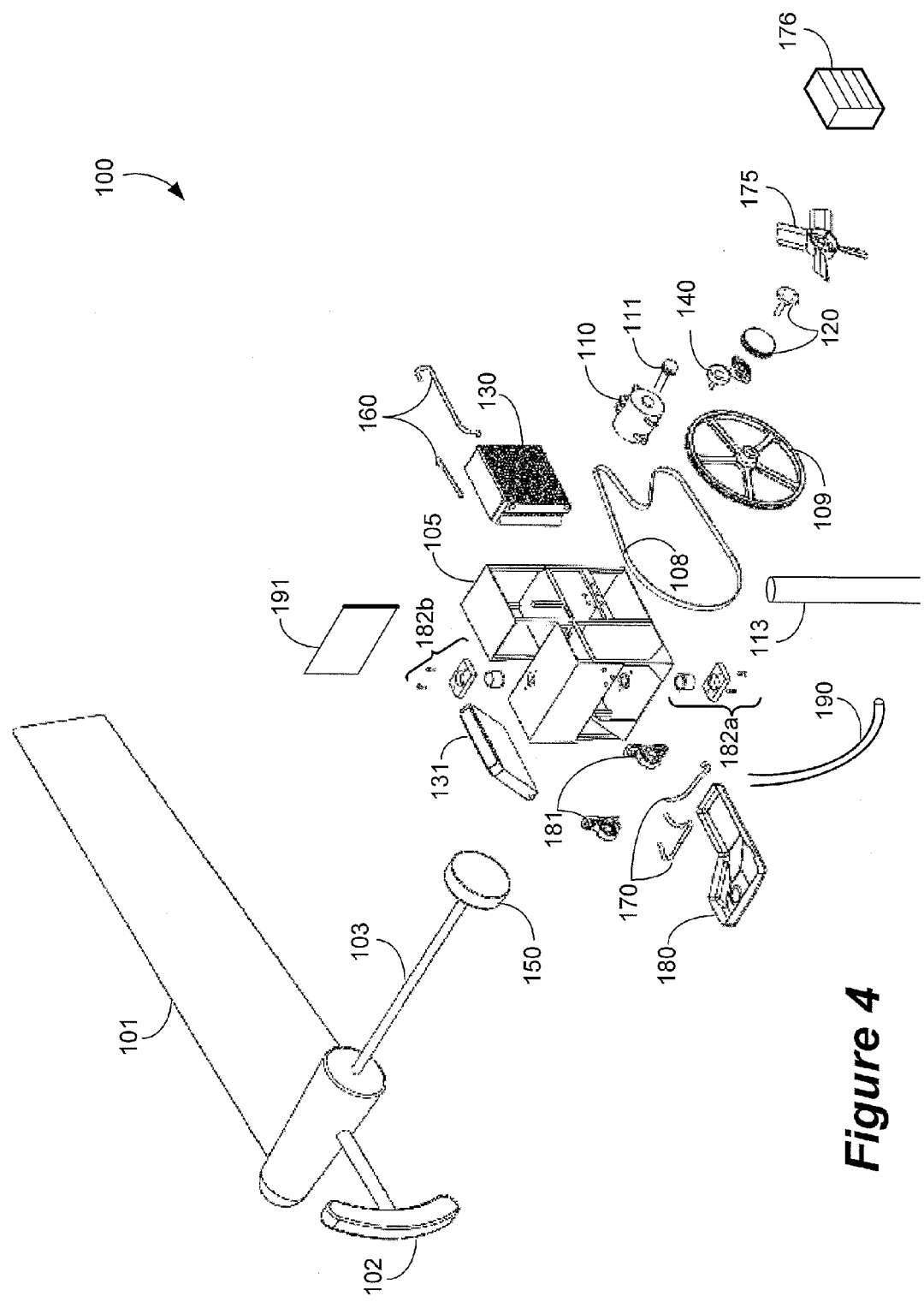
FIG. 4 is a graphical representation (perspective exploded view) of an exemplary, non-limiting self-contained water generation system.

FIG. 4 illustrates a perspective exploded view of system 100, including blade 101, blade counterweight 102, counterweight 150, pulley 109, belt 108, compressor 110, compressor shaft 111, condenser 131, evaporator 130, fan bearing assembly 120, housing 105, drain line 190, condensate collector 180, refrigerant piping lines 160 and 170, and column 113. As discussed above, system 100 may include fan 175 that may be attached or affixed to fan bearing assembly 120, or any other component of system 100, that may provide an air stream to assist in the condensation of liquid water by evaporator 130. In some embodiments, louvers 176 or other means, such as baffles, vanes, or any other air flow affecting mechanism, that may affect air flow may be configured on or about fan 175, assisting in directing air onto fan 175 for propulsion over condenser 131 and evaporator 130, protecting fan 175 and other components of system 100 from dirt and interference from foreign objects, and/or protecting users or others who may encounter system 100 by preventing such users or others from being cut by moving blades of fan 175. Louvers 176 may be any type of fan and/or duct enclosure, filter (such as a dust filter), any other type of fan accessories or component, or any combination thereof. All such embodiments are contemplated as within the scope of the present disclosure.

In one embodiment, fan 175 may be designed to motivate an appropriate volume of air over condenser 131 and evaporator 130 such that a maximum condensation of atmospheric water vapor may be achieved. In some embodiments, fan 175 may be driven indirectly by shaft 103, for example via belt 108 and fan bearing assembly 120. Alternatively, fan 175 may be driven directly or indirectly by mechanical and/or electrical means, such as gearings, chain and sprocket mechanisms, and electric motors. Such an electric motor may be powered by electricity generated by the wind turbine portion of water generation system 100, thereby keeping water generation system 100 entirely self contained and not reliant on external power sources. Alternatively, fan 175 may be driven directly by shaft 103. Any other motivation for fan 175 may be used, and all such embodiments are contemplated as within the scope of the present disclosure.

Air moved by fan 175 may be motivated through housing 105 and directed over compressor 110, condenser 131, and/or evaporator 130. This may provide for a higher cooling efficiency of system 100 by increasing the temperature difference between the air flow and the surface temperature of condenser 131 (or coils configured thereon) as compared to using an air flow from outside of the housing that is at the ambient air temperature. The increased temperature difference may be created by using the cooled air coming off the evaporator to cool the condenser (see FIG. 3 for one embodiment using this method). This is unlike traditional air conditioning units that remove this cooled air for use in cooling the air of an enclosed space or other areas. The resulting increase in thermal efficiency may allow for a reduction in the size of compressor 110 condenser 131, and/or evaporator 130 needed to produce a given amount of liquid water.

Also shown in FIG. 4 are various pieces of hardware that may be used in the assembly of system 100. For example, bearings 181 may be used to affix shaft 103 to housing 105. Hardware 182a and 182b may be used to affix housing 105 to column 113, in one embodiment allowing housing 105 to rotate about column 113 such that blade 101 to be placed in an optimum position relative to the wind direction. Hardware 182a and 182b may be constructed, at least in part, of Teflon or high density plastic that allows housing 105 to rotate about column 113 with reduced friction. Alternatively, hardware 182a and 182b may employ bearings or any other type of means or mechanisms that may allow housing 105 to rotate about column 113. In one embodiment, column 113 may be configured to run vertically through housing 105, which may be affixed to housing 105 with hardware 182a at the bottom of housing 105 and hardware 182b at the top of housing 105. This configuration may improve the stability of system 100 and allow the entirety of system 100 affixed or attached to housing 105 to rotate about column 113. In alternate embodiments, housing 105 may be affixed to column 113 using only hardware 182a. In such embodiments, column 113 may not run through housing 105, but may instead affix to the bottom of housing 105. Alternative configurations and mounting options for housing 105 and system 100 in general are contemplated.

In one embodiment, column 113 may be constructed from nesting sections for ease of shipping and to enable adjustment of the height of column 113. The lowest section of column 113 may be configured to be waterproof and hold collected water. In one embodiment, condensed water may be used or routed for use as drinking water or irrigation water. In another embodiment, condensed water may first be routed through a water jacket configured on coils of condenser 131 and/or routed through compressor 110 to increase the thermal efficiency of compressor 110 and/or condenser 131. Alternatively, it is contemplated that the collected condensed water may be used for chilled water cooling of food storage devices or living spaces. In one embodiment, after the chilled water is used for cooling, it may then be used for other purposes.

The elements of system 100 as described herein may be housed entirely or primarily within housing 105. Housing 105 may be mounted on top of column 113 and attached to bearing (in one embodiment such a bearing may be a component of hardware 182a and/or 182b) which may be affixed between housing 105 and column 113. Such a bearing may provide a pivot point about which housing 105 may rotate in the horizontal plane so as to present the plane of rotation of blade 101 perpendicular to the direction of the wind on the windward end of the housing with a wind blowing from any direction. Torque to turn the housing may be supplied by the wind and leveraged by blade 101 to rotate housing 105.

Alternatively, torque to turn the housing may be supplied by wind from a different direction pushing on extension 191 of housing 105. Extension 191 may be swung into a trailing position in line with a side of housing 105 on a hinge mounted on the downwind end of housing 105 parallel to shaft 103 and stopping just in front of blade 101 of the wind turbine portion of water generation system 100. In some embodiments, extension 191 may be locked into place by a brace attached to extension 191 and housing 105. Such a brace may be fixed so that extension 191, a side of housing 105, and the brace form a right angle, rigidly locking the extension and allowing the force of the wind acting upon extension 191 to create a torque around the horizontal center of rotation of housing 105 atop column 113 that may move the plane of rotation of blade 101 so that the plane of rotation is perpendicular to the direction of the wind. The size and square footage of such extension 191 may be determined by the amount of force needed to overcome the retarding force of the wind acting on blade 101 and that portion of the front of housing 105 to windward of the vertical axis of horizontal rotation at the center line of column 113.

Figure 5:
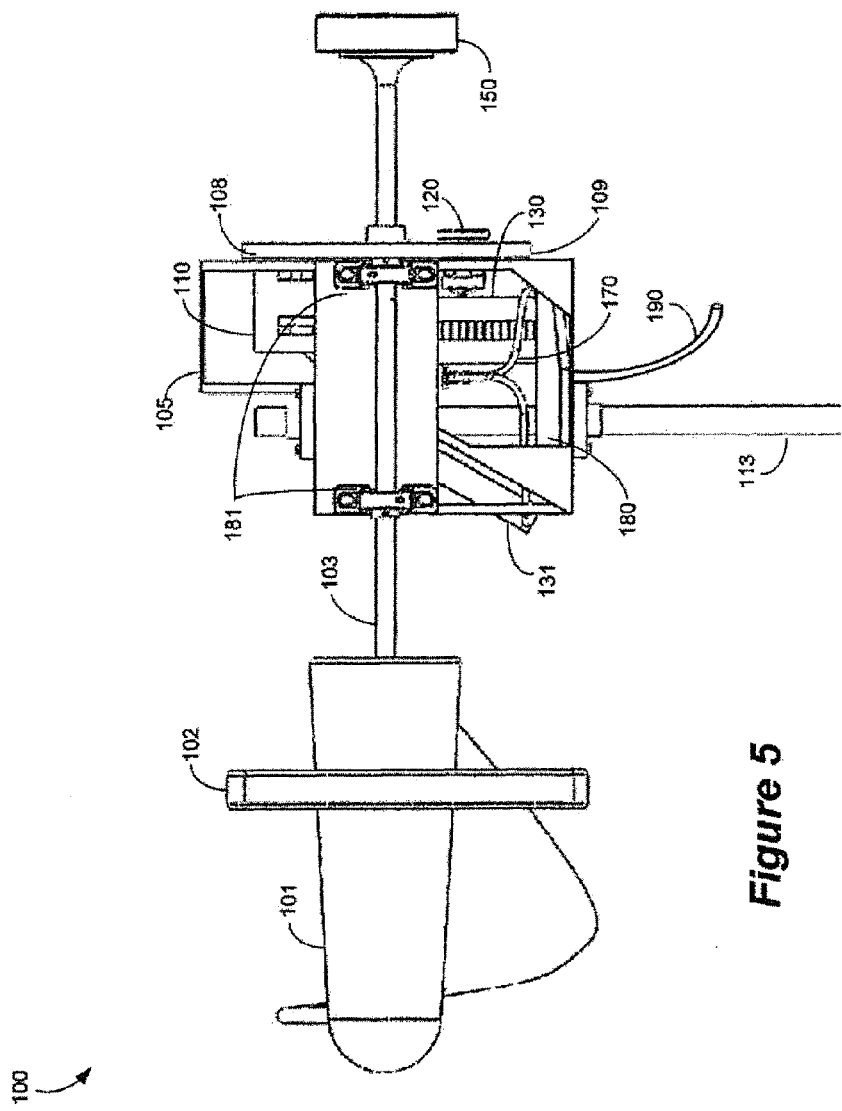
FIG. 5 is a graphical representation (side elevation view) of an exemplary, non-limiting self-contained water generation system.

In order to provide further detail on embodiments that may be implemented with the subject matter disclosed herein, FIG. 5 illustrates a side elevation view of exemplary non-limiting system 100, including blade 101, blade counterweight 102, counterweight 150, shaft 103, pulley 109, belt 108, compressor 110, condenser 131, evaporator 130, fan bearing assembly 120, housing 105, refrigerant line 170, drain line 190, condensate collector 180, bearings 181, and column 113.

Figure 6:
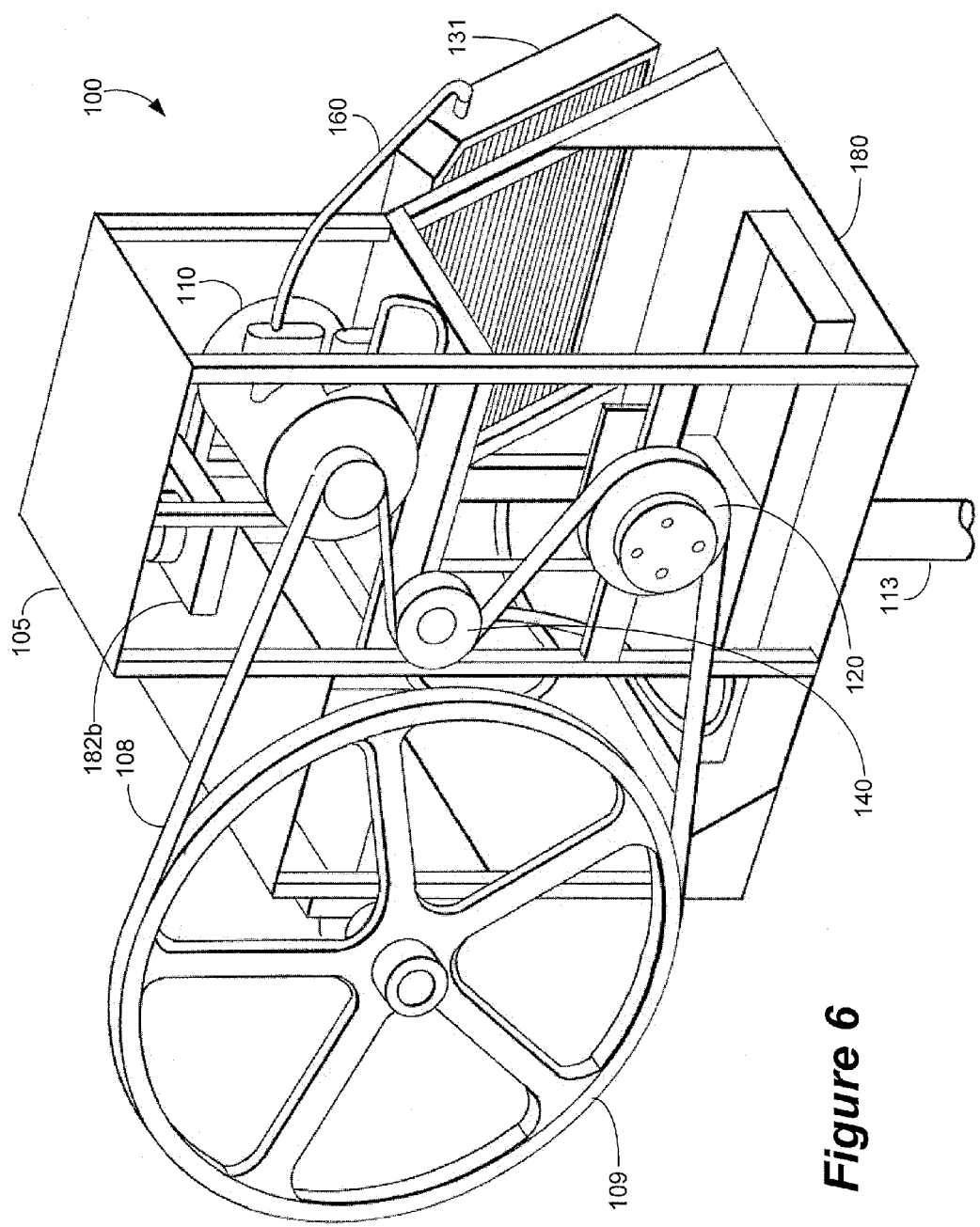
FIG. 6 is a three-dimensional graphical representation (perspective view) of an exemplary, non-limiting self-contained water generation system.

Providing still additional description of the present disclosure is FIG. 6, a perspective view of system 100. In FIG. 6, blade 101, blade counterweight 102, counterweight 150, evaporator 130, and shaft 103 are not shown so that other elements of the system 100 can be clearly seen. However, such elements may be configured in the embodiment illustrated in FIG. 6. Elements visibly shown in FIG. 6 include pulley 109, belt 108, compressor 110, condenser 131, fan base bearing assembly 120, belt tensioning pulley 140, housing 105, condensate collector 180, refrigerant piping lines 160, hardware 182*b*, and column 113.

Figure 7:
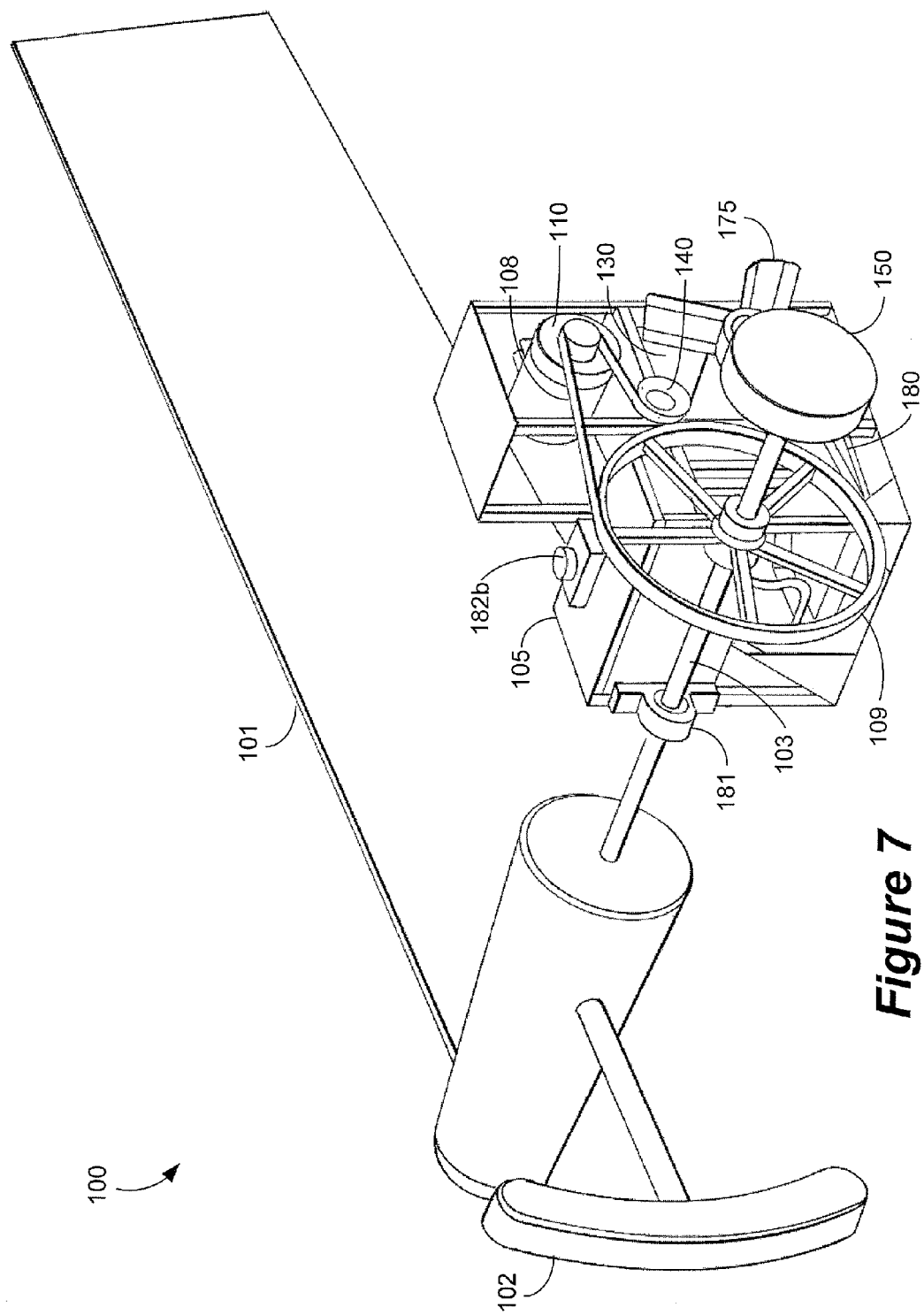
FIG. 7 is another three-dimensional graphical representation (perspective view) of an exemplary, non-limiting self-contained water generation system.

FIG. 7 provides another perspective view of one embodiment of system 100. In FIG. 7, the components of system 100 are shown assembled according to a contemplated configuration, including blade 101, blade counterweight 102, counterweight 150, evaporator 130, shaft 103, pulley 109, belt 108, fan 175, compressor 110, belt tensioning pulley 140, housing 105, condensate collector 180, hardware 182*b*, and bearings 181. Other components described herein may be configured in the embodiment illustrated in FIG. 7, but may be obscured due to the viewpoint of this figure.

In alternative embodiments, rather than using one or more belts and/or pulleys or otherwise employing a belt-driven system, a system as described herein may be configured such that a blade motivated by wind energy directly actuates components such as a fan, evaporator, compressor, condenser, etc. Such actuation may be achieved using mechanical gearing, chain and sprocket configurations, or any other mechanical configuration that may translate the energy of, for example, shaft 103 to compressor shaft 111 and/or other components. An example of such an embodiment is illustrated in FIG. 8.

Figure 8:
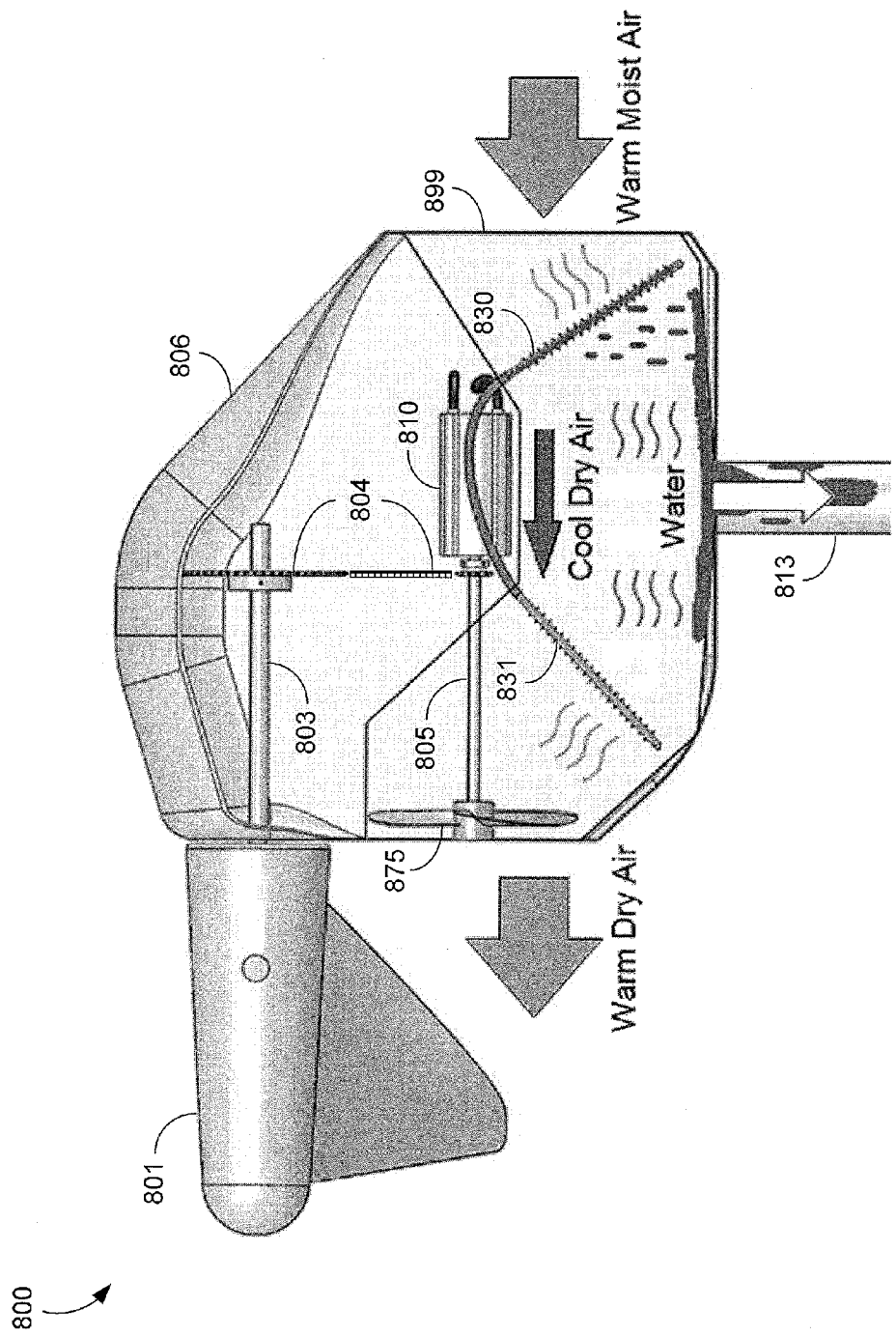
FIG. 8 is a graphical representation (side elevation view) of an exemplary, non-limiting self-contained water generation system.

System 800 in FIG. 8 may include blade 801 that may rotate shaft 803 when motivated by wind forces. Shaft 803 maybe affixed to gearing 804, which may rotate in response to the rotation of shaft 803, ultimately rotating shaft 805. Shaft 805, when rotated by gearing 804, may actuate compressor 810, fan 875, and/or other components of system 800. Gearing 800 may constructed such that an optimum rotational speed of shaft 805 is achieved to ensure efficient operation at expected wind speeds. When actuated by shaft 805, compressor 810 may motivate refrigerant through evaporator 830 and condenser 831 to generate water condensed from atmospheric water vapor as described herein. Such water may be collected or drained through column 813. Note that FIG. 8 also illustrates the process of water condensation, which is improved by fan 875 drawing air from the environment through opening 899 over evaporator 830 and condenser 831. Any other means, devices, components, or combinations thereof that may be configured in system 800 in order to translate the energy created by wind actuation of blade 801 to compressor 810, fan 875, and/or other components are contemplated as within the scope of the present disclosure.

System 800, or any system constructed according to the present disclosure, may be enclosed in a shroud such as shroud 806. Shroud 806 may protect one or more of the components of system 800 from the elements. Shroud 806 may also be designed to provide increased air flow to certain areas or sections of system 800 to increase the efficiency of the system. For example, shroud 806 may be configured such that air is directed into opening 899 and thus more easily drawn through system 800 by fan 875. Alternatively, in embodiments where no fan is used, shroud 806 may be configured to improve the flow of environmental air over evaporator 830 and/or condenser 831. All such embodiments are contemplated as within the scope of the present disclosure.

In another embodiment, illustrated in FIG. 9, system 900, which may be a system such as system 100 of FIGS. 1, 2, and 4-7, may be at least partially enclosed in a shroud. FIG. 9 illustrates a side elevation view of system 900. System 900 may be configured with blade 901, blade counterweight 902, and column 913. Other components that may be configured in system 900, such as a compressor, evaporator, condenser, fan, belt, shafts, housing, condensate collector, drain and refrigerant lines, etc., may be enclosed in shroud 906. Configured in shroud 906 may be opening 976. Opening 976 may simply be an opening that allows air to circulate inside shroud 906, in one embodiment drawn into shroud 906 by a fan. Alternatively, opening 976 may be configured with louvers or other means that affect the airflow into and/or out of shroud 906. In some embodiments, there may also be a second opening that also allows air to escape and enter shroud 906, in one embodiment configured at the opposite end of system 900 as opening 976. By using two openings, air may flow through system 900 by entering one opening and exiting the other opening. Air may be drawn through either (or both) openings using one or more fans as disclosed herein. Any type of shroud may be used, and such shrouds may be constructed of any type of material or combination of materials. All such embodiments are contemplated as within the scope of the present disclosure.

Note that any of the systems described herein may be mounted on a column (such as column 113, 813, and 913) that projects the system a significant distance into the air. For example, systems such systems 100, 800, and 900 may be mounted on columns or otherwise configured such that they are 10-50 feet in the air. By configuring such systems significantly above the ground, any of several benefits may be realized. The wind flow several feet into the air may be much stronger than the wind flow closer to the ground. Configuring the presently disclosed systems higher in the air may allow the installation of such systems over the top of buildings, homes, and other structures. Moreover, because the systems disclosed herein may employ wind turbine blades that may be large and rapidly moving, configuring such systems higher in the air may help avoid injury to people and animals that may be on the ground near such a system. The presently disclosed systems may be configured at any height and on any scale, and all such embodiments are contemplated as within the scope of the present disclosure.

Figure 10A:
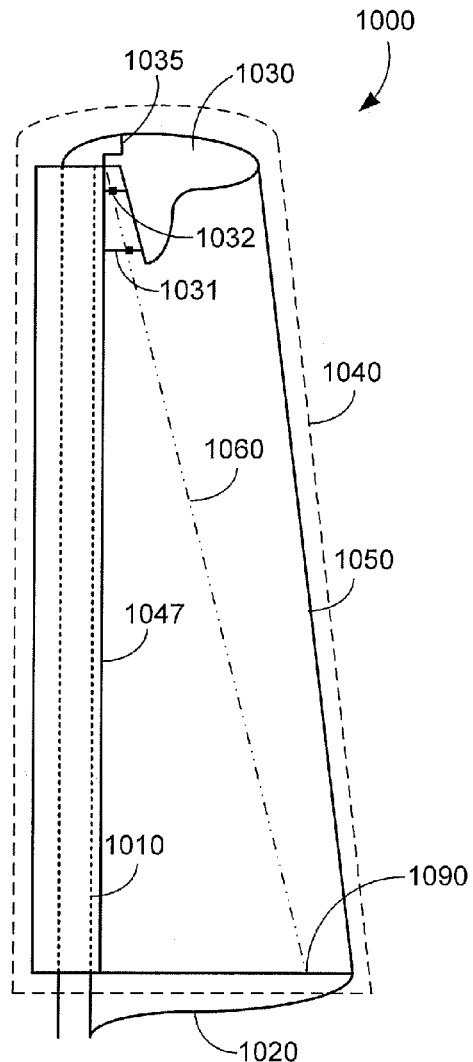
FIG. 10$a$ is a graphical representation (plan view) of an exemplary non-limiting blade that may be used in embodiments of a self-contained water generation system.

FIG. 10a illustrates a non-limiting exemplary blade 1000 that may be used with any embodiments of the presently disclosed subject matter. Blade 1000 may be configured with blade spar 1010, leading edge member 1047, root member 1020, blade tip member 1030, trailing edge member 1050, and blade sleeve 1040. In one embodiment, trailing edge member 1050 may be a wire constructed of any material and attached at either end to root member 1020 and blade tip member 1030, but in other embodiments trailing edge member 1050 may be of any type of construction and attached at any location(s) of blade 1000. Spar 1010, leading edge member 1047, root member 1020, blade tip member 1030, and trailing edge member 1050 may create a frame over which sleeve 1040 may be configured. Sleeve 1040 may cover a substantial portion of blade 1000 and serving as the means to be motivated by wind forces. Sleeve 1040 may be constructed of any flexible material that allows blade sleeve 1040 to fit over the other components of blade 1000, such as cloth or plastic, and may be attached components of blade 1000 using any effective means.

Root member 1020 may be rigidly attached to spar 1010. Alternatively, spar 1010 and root member 1020 may be a single integrated component. Blade tip member 1030 may be hingedly or rotatably attached to spar 1010 at hinge 1035. Blade tip member 1030 may also be attached to spar 1010 using hinge members 1031 and 1032. Hinge members 1031 and 1032 may allow blade tip member 1030 to rotate about axis 1060. Axis 1060 may be the axis created on a line from the tip of spar 1010 to intersection point 1090, which may be a point between the point of intersection of root member 1020 and spar 1010 and the end (the point farthest from spar 1010) of root member 1020. In one embodiment, intersection point 1090 may be at a point between the midpoint of root member 1020 and the end of root member 1020. In some embodiments, the range of motion of blade tip member 1030 about axis 1060 may be limited to a specific number of degrees from center. Note that hinge 1035 and hinge members 1031 and 1032 may be any type of hinge or other movable connection means.

By having blade tip member 1030 rotate about axis 1060, rather than, for example, about spar 1010, blade 1000 remains twistable (in one embodiment at least as much as allowed by hinge 1035 and hinge members 1031 and 1032) yet stable. This is due to trailing edge member 1050 returning to a neutral or in-plane position relative to the plane formed by spar 1010 and root member 1020 when there are not wind forces acting on sleeve 1040. Trailing edge member 1050 may be returned to a neutral position due to the tension created by it connection to root tip member 1020 and blade tip member 1030, which in effect pulls blade tip member 1030 back to a neutral position when no wind forces are manipulating blade 1000. This effect may be increased the closer to the end of root member 1020 that intersection point 1090 is located.

Figure 10B:
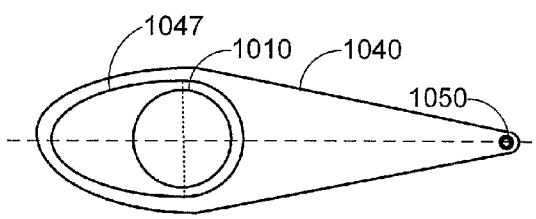

Leading edge member 1047 may also be configured to react in a beneficial way to wind forces acting on blade 1000. In one embodiment, leading edge member 1047 may be constructed of foam or another flexible material and may be aerodynamically shaped, as illustrated in FIG. 10b which illustrates a cross-section of leading edge member 1047 configured on spar 1010, with sleeve 1040 configured about leading edge member 1047, spar 1010, and trailing edge member 1050. In FIG. 10b, there are no wind forces acting on sleeve 1040, so leading edge member 1040 is in a neutral position. Leading edge member 1047 may also be configured to be rotatable about spar 1010. Because leading edge member 1047 is rotatable about spar 1010, it may change position as sleeve 1040 is manipulated by wind forces, improving the aerodynamic characteristics of blade 1000 by modifying the shape of blade 1000.

Figure 10C:
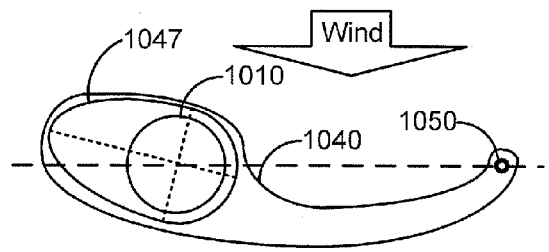

For example, as shown in FIG. 10c, when sleeve 1040 is affected by wind forces and is deformed to a concave shape, leading edge member 1047 may be rotated by the pull of the material of sleeve 1040 to improve the angle of attack of sleeve 1040, thus improving the aerodynamic characteristics of blade 1000 and the ability of blade 1000 to extract energy from the wind. This increase in angle of attack may assist blade 1000 in initiating motion and maximizing the energy harnessed by blade 1000 from wind forces.

Figure 10D:
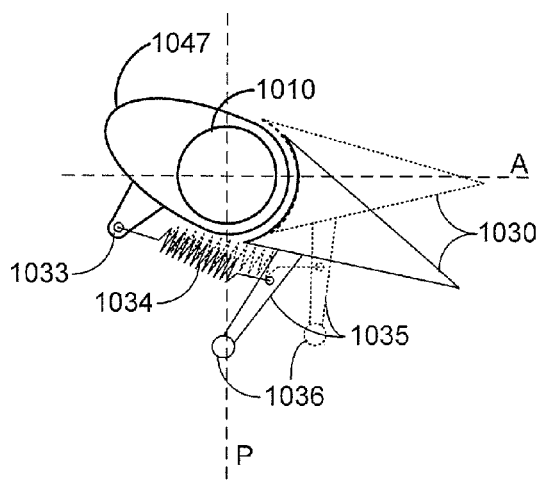

As noted above, blade tip member 1030 may be configured to pivot on axis 1060. FIG. 10d illustrates an exemplary embodiment for controlling the pivot of blade tip member 1030. In FIG. 10d, spar 1010, leading edge member 1047, and blade tip member 1030 are shown in cross section. Blade tip member 1030 may be controlled in it rotation about axis 1060 by spring 1034 and weight 1036. Spring 1034 may be connected to spar 1010 and/or leading edge member 1047 by connector 1033, while weight 1036 maybe connected to blade tip member 1030 by connector 1035. Weight 1036 may be configured to face the plane of rotation of blade 1000. Spring 1034 may bias blade tip member 1030 so that it tends to rotate forward toward the plane of rotation (labeled 'P' in FIG. 10d) for blade 1000 which is beneficial in low wind speeds in starting the rotation of blade 1000 and increasing rate of revolutions of blade 1000. As wind forces increases into a desirable wind speed range, such forces may tend to rotate blade tip member 1030 toward the axis of rotation (labeled 'A' in FIG. 10d), which in turn makes blade 1000 more aerodynamic and thus may diminish blade twist and reduce wind drag. As the wind speeds increase into a higher, undesirable wind speed range, the effects of the wind forces and the centrifugal forces acting on the weight further reduce blade twist by further rotating blade tip member 1030 toward the axis of rotation reducing blade revolutions and the resultant wind drag. However, as wind speed is reduced, the tension force of spring 1034 may overcome these forces, pulling blade tip member 1030 towards the plane of rotation and increasing blade twist which helps maintain blade 1000 in a desirable rate of revolution range that is not associated with undesirable amounts of wind drag. Thus, at lower wind speeds, spring 1034 may help keep blade tip member 1030 in a position that allows blade 1000 to extract the most energy from the wind.

The centrifugal forces acting upon weight 1036 may increase as blade 1000 rotates more rapidly, moving weight 1036 away from the axis of rotation. At higher revolutions, these centrifugal forces may become greater than the force provided by spring 1034, and blade tip member 1030 may move towards the axis of rotation. At high revolutions of blade 1000, blade tip member 1030 may be at the position indicated by the dashed lines in FIG. 10d. By moving blade tip member 1030 toward the axis of rotation at high speeds, the shape of blade 1000 may be altered by diminishing blade twist and thereby decreasing blade drag, which may result in reducing the blade revolution rate. Thus, overspeed may be reduced or eliminated at high wind forces, yet at lower wind forces, the shape and twist of blade 1000 may be such that wind drag is reduced by keeping the blade revolution rate in a desirable range and the revolutions of blade 1000 increased until a point is reached where blade tip member 1030 is pulled toward the axis of rotation by the centrifugal forces acting on weight 1036. At this point, another cycle of adjustment of the geometric twist of blade 1000 may begin, and further adjustment of the geometric twist of blade 1000 and the resultant blade revolution rate and wind drag may be performed as needed based on the wind forces acting on blade 1000.

The entire water generation system 100 may be designed and constructed to be relatively small and lightweight so that is can be easily installed and operated in remote locations by one or a few people. Alternatively, water generation system 100 may be constructed of components that are easily upgraded, changed, or replaced by those with little mechanical skill and/or few tools, allowing water generation system 100 to be altered or repaired as needed by inexperienced users. Water generation system 100 may incorporate elements that are readily available and relatively inexpensive, such as automotive air conditioning components rather than building air conditioning components. All such embodiments are contemplated as within the scope of the present disclosure.

Note that methods of performing any of the actions described above in relation to the components of the disclosed water generation systems are also contemplated as aspects of the present disclosure. Such methods may incorporate any or all of the functions, steps, and/or actions described herein, in any order or combination. All such methods are contemplated as within the scope of the present disclosure.

What is claimed is:

1. A self-contained water generation system comprising:
   a wind turbine comprising at least one blade that is capable of being actuating by wind, a horizontally-oriented shaft, a pulley, and a counterweight,
      wherein the at least one blade is configured on a first end of the shaft and the counterweight is configured concentric to the shaft on a second end of the shaft,
      wherein the pulley is configured about the shaft between the at least one blade and the counterweight and;
   wherein the belt is configured about the pulley;
   a compressor connected to the wind turbine such that when the wind turbine is actuated by the wind, the wind turbine mechanically and non-electrically drives the compressor to pump refrigerant;
   an evaporator connected to the compressor that receives pumped refrigerant and allows the pumped refrigerant to evaporate resulting in condensation of water on an exterior of the evaporator;
   a fan actuated by the belt such that when the wind turbine is actuated by the wind the fan motivates an air stream at the evaporator; and—
   a collector that collects the water.

2. The self-contained water generation system of claim 1, wherein the belt is configured about a plurality of pulleys.

3. The self-contained water generation system of claim 2, wherein the plurality of pulleys actuate at least one of the fan, the compressor, a fan bearing assembly, or a belt tensioning pulley.

4. The self-contained water generation system of claim 1, wherein the wind turbine further comprises a blade counterweight configured on the first end of the shaft to rotate about the shaft opposite the at least one blade.

5. The self-contained water generation system of claim 1, wherein the compressor, the evaporator, and the collector are enclosed in a housing.

6. The self-contained water generation system of claim 5, wherein the housing is affixed on a column.

7. The self-contained water generation system of claim 6, wherein the housing is rotatable about the column.

8. The self-contained water generation system of claim 6, wherein the collector is configured to drain the water into the column.

9. The self-contained water generation system of claim 5, wherein the housing is rotatably configured about the column.

10. The self-contained water generation system of claim 1, further comprising a drain line that accepts the water from the collector and provides the water to a water storage means.

11. The self-contained water generation system of claim 1, further comprising an enclosure configured about the compressor, the evaporator, and the collector.

12. A method of generating water, comprising:
    collecting energy from wind with a wind turbine comprising at least one blade that is capable of being actuating by wind, a horizontally-oriented shaft, a pulley, and a counterweight;
       wherein the at least one blade is configured on a first end of the shaft and the counterweight is configured concentric to the shaft on a second end of the shaft, and
       wherein the pulley is configured about the shaft between the at least one blade and the counterweight, and;
    wherein the belt is configured about the pulley;
    mechanically and non-electrically driving a compressor connected to the wind turbine to pump refrigerant to an evaporator when the wind turbine is actuated by the wind;
    evaporating the refrigerant in the evaporator resulting in condensation of water on the exterior of the evaporator;
    actuating the fan by the belt when the wind turbine is actuated by the wind to motivate an airstream at the evaporator; and—
    collecting the water.

13. The method of claim 12, further comprising draining the water into a water storage means.

14. The method of claim 12, wherein the wind turbine further comprises a blade counter weight configured on the first end of the shaft to rotate about the shaft opposite the at least one blade.

15. The method of claim 12, further comprising draining the water into a column upon which the wind turbine is mounted.

* * * * *